US012740510B2

(12) United States Patent
Vandike et al.

(10) Patent No.: US 12,740,510 B2
(45) Date of Patent: Sep. 22, 2026

(54) OVERBLOWN GRAIN LOSS DETECTION

(71) Applicant: Deere & Company, Moline, IL (US)

(72) Inventors: Nathan R. Vandike, Geneseo, IL (US); Rana Shakti Singh, Ramgarh (IN)

(73) Assignee: Deere & Company, Moline, IL (US)

( * ) Notice: Subject to any disclaimer, the term of this patent is extended or adjusted under 35 U.S.C. 154(b) by 456 days.

(21) Appl. No.: 18/479,288

(22) Filed: Oct. 2, 2023

(65) Prior Publication Data

US 2025/0107486 A1 Apr. 3, 2025

(51) Int. Cl.
*A01D 41/127* (2006.01)
*A01F 12/44* (2006.01)

(52) U.S. Cl.
CPC ........ *A01D 41/1273* (2013.01); *A01F 12/444* (2013.01)

(58) Field of Classification Search
CPC .............. A01D 41/1273; A01D 41/127; A01D 41/1276; A01D 41/1277; A01F 12/444
See application file for complete search history.

(56) References Cited

U.S. PATENT DOCUMENTS 9,179,599 B2 * 11/2015 Bischoff .............. A01D 41/127
9,226,449 B2 * 1/2016 Bischoff .............. A01D 41/127
10,989,833 B2 * 4/2021 Ferren ................... H04N 23/56
12,329,064 B2 * 6/2025 Hermann ................ G01P 5/242
2005/0026662 A1 * 2/2005 Fechner ............. A01D 41/1271 460/1
2009/0286582 A1 * 11/2009 Kormann ............. A01D 41/127 56/10.1
2014/0171161 A1 * 6/2014 Bischoff .............. A01D 41/127 460/1
2017/0071125 A1 * 3/2017 Pfeiffer .............. A01D 41/1276
2017/0112057 A1 * 4/2017 Loukili ................ A01D 41/127
2018/0000011 A1 * 1/2018 Schleusner ............. G01S 13/87
2020/0029498 A1 * 1/2020 Vandike ................ A01F 12/446
2020/0375104 A1 * 12/2020 Yu ........................... G06N 3/09

(Continued)

FOREIGN PATENT DOCUMENTS

CA 2941026 C * 9/2023 ............. G06Q 50/02
DE 102015224175 B3 * 4/2017 ......... A01D 41/1273

(Continued)

OTHER PUBLICATIONS

Agriculture MDPI, "Improving Cleaning Performance of Rice Combine Harvesters by DEM-CFD Coupling Technology", Ding et al. (Sep. 13, 2022)(19 pages).

*Primary Examiner* — Babar Sarwar
(74) *Attorney, Agent, or Firm* — Lucian Wayne Beavers; Patterson Intellectual Property Law, PC

(57) ABSTRACT

A method of operating a grain harvesting machine includes: capturing images of a crop material flow in an image capture area of the grain harvesting machine; identifying a plurality of grain elements in the images; determining a velocity of each of the grain elements; determining whether each of the grain elements is likely to be overblown out of the grain harvesting machine based at least in part on the velocity of each of the grain elements; and controlling a subsystem of the grain harvesting machine at least in part based upon the determination of whether the grain elements are likely to be overblown. A grain harvesting machine for performing such a method is also disclosed.

20 Claims, 5 Drawing Sheets

(56) References Cited

U.S. PATENT DOCUMENTS

| | | | | |
|---|---|---|---|---|
| 2021/0088691 | A1* | 3/2021 | Ferren | G06T 7/0004 |
| 2022/0071088 | A1* | 3/2022 | Hermann | A01F 12/448 |
| 2022/0084191 | A1* | 3/2022 | Fischer | G06T 7/0004 |
| 2022/0132736 | A1* | 5/2022 | Meyers | A01D 41/1273<br>460/7 |
| 2022/0354055 | A1* | 11/2022 | Hermann | A01D 41/1273 |
| 2023/0157212 | A1* | 5/2023 | Jung | A01D 41/12<br>460/109 |
| 2024/0130281 | A1* | 4/2024 | Maney | A01D 41/1273 |
| 2025/0107488 | A1* | 4/2025 | Martin | G06V 20/50 |
| 2025/0287871 | A1* | 9/2025 | Kringe | A01D 41/1277 |

FOREIGN PATENT DOCUMENTS

| | | | | |
|---|---|---|---|---|
| EP | 0077667 | A1 * | 4/1983 | A01D 41/127 |
| GB | 2387098 | A * | 10/2003 | B07B 4/08 |
| WO | WO-2008126013 | A2 * | 10/2008 | A01D 41/1274 |
| WO | WO-2021131317 | A1 * | 7/2021 | G06V 10/774 |
| WO | WO-2021183837 | A1 * | 9/2021 | G01N 1/20 |
| WO | WO-2023021005 | A1 * | 2/2023 | G06T 7/0002 |
| WO | WO-2024036401 | A1 * | 2/2024 | A01D 41/1276 |

* cited by examiner

OVERBLOWN GRAIN LOSS DETECTION

BACKGROUND

1. Field of the Invention

The present application relates to systems for determining grain loss in the operation of a grain harvesting machine.

2. Background of the Disclosure

When operating a grain harvesting machine it is desirable to measure the amount of grain loss in the stream of exhausted plant material that passes through the grain harvesting machine and flows back onto the ground. Accurate measurement of grain loss enables the various systems of the grain harvesting machine to be properly adjusted to reduce the grain loss.

SUMMARY

In a first embodiment a method of operating a grain harvesting machine comprises: capturing images of a crop material flow in an image capture area of the grain harvesting machine; identifying at least one grain element in the images; determining a velocity of the grain element; determining whether the grain element is likely to be overblown out of the grain harvesting machine based at least in part on the velocity of the grain element; and controlling a subsystem of the grain harvesting machine at least in part based upon the determination of whether the grain element is likely to be overblown.

In another embodiment a grain harvesting machine for harvesting a crop material and separating the crop material into grain and material other than grain (MOG) comprises a grain thresher configured to separate grain from MOG, a chaffer and sieve system located below the grain thresher, a blower fan configured to blow air across the chaffer and sieve system, at least one image capture sensor configured to capture images of a crop material flow in an image capture area of the grain harvesting machine, and a controller configured to: identify one or more elements of the crop material flow in the images as grain elements; determine a velocity of at least one of the grain elements; determine whether the at least one grain element is likely to be overblown out of the grain harvesting machine based at least in part on the velocity of the at least one grain element; and control at least one operating parameter of the grain harvesting machine based at least in part on the determination of whether the at least one grain element is likely to be overblown.

Numerous objects, features and advantages of the embodiments set forth herein will be readily apparent to those skilled in the art upon reading of the following disclosure when taken in conjunction with the accompanying drawings.

DETAILED DESCRIPTION

When operating a grain harvesting machine it is desirable to measure the amount of grain loss in the stream of exhausted plant material that passes through the grain harvesting machine and flows back onto the ground. Accurate measurement of grain loss enables the various systems of the grain harvesting machine to be properly adjusted to reduce the grain loss. As used herein, "grain" may be any relevant agricultural material, including seeds, kernels, beans or the like.

One problem that has been encountered in prior systems for measuring grain loss is the problem of identifying losses of grain that is overblown out the back of the harvesting machine. This "overblown" grain is grain material that is entrained in the air stream flowing across the chaffer and sieve system of the harvesting machine and flows out the back of the harvesting machine with that air stream.

The present disclosure provides an image-based measurement system with an improved ability to identify and measure the overblown grain loss.

Figure 1:
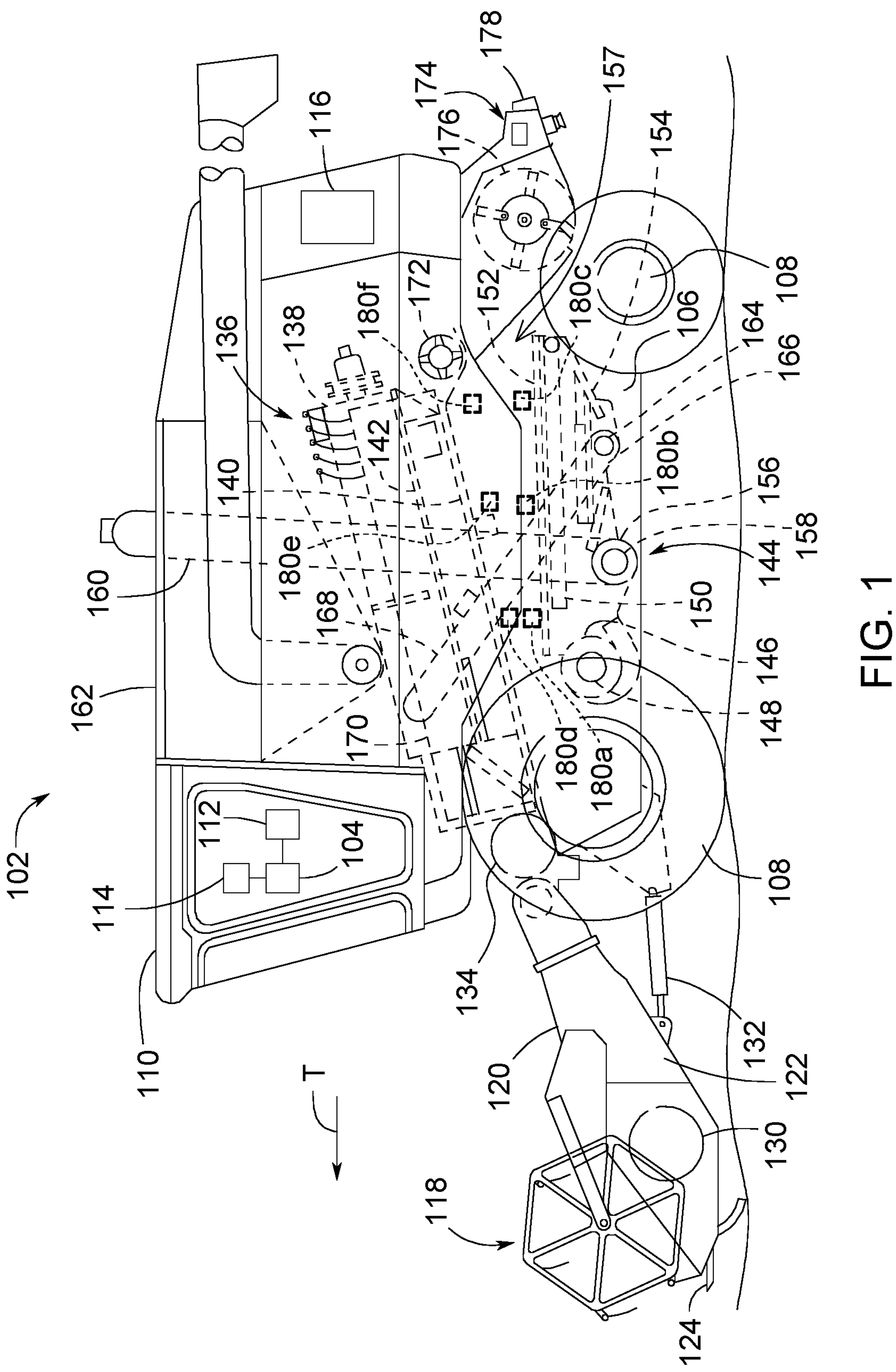
FIG. 1 is a schematic left side elevation view of a grain harvesting machine.

Referring now to FIG. 1, a grain harvesting machine 102 in the form of a combine harvester is shown. The grain harvesting machine 102 includes a controller 104 that controls and/or facilitates operation of various aspects of the grain harvesting machine 102.

As shown, the example grain harvesting machine 102 includes a chassis 106 with ground-engaging wheels 108 or tracks. The wheels 108 are rotatably mounted to the chassis 106 and engage with the ground to propel the grain harvesting machine 102 in a travel direction T. An operator's cab 110, also mounted to the chassis 106, houses an operator as well as various devices to control the harvester 102, such as one or more operator input devices 112 and/or display devices 114, further described below.

The wheels 108 and other devices of the harvester 102 are powered by an internal combustion engine 116 or other power source. The engine 116 may be operated based on commands from the operator and/or the controller 104.

A header 118 is mounted at the front of the chassis 106 of the grain harvesting machine 102 to cut and gather crop material from a field. The header 118 is supported by a feederhouse 120 pivotally mounted to the chassis 106. The header 118 includes a frame 122 supporting a cutter bar 124 that extends substantially across the length of the header 118 and that functions to cut crops along the ground. The header 118 may further include a mechanism for collecting the cut material from the cutter bar 124. In this example, the header 118 includes an auger 130 to transport the cut crop material towards the center of the header 118. Other examples may include one or more conveyors. The header 118 may include a header actuator 132 that functions to reposition the header 118 relative to the ground and/or in front and rearward directions. The feederhouse 120 may include, for example, an inclined conveyor (not shown) to transport cut crop material from the header 118 into the body of the grain harvesting machine 102.

After passing over a guide drum or feed accelerator 134, the crop material from the feederhouse 120 reaches a generally fore-aft oriented threshing device or separator or thresher 136. Other embodiments may include laterally oriented or other threshing devices (not shown). In the embodiment depicted, the separator 136 includes a rotor 138 on which various threshing elements are mounted. The rotor 138 rotates above one or more grated or sieved threshing baskets or concaves 140, such that crop material passing between the rotor 138 and the concaves 140 is separated, at least in part, into grain and chaff (or other "material other than grain" (MOG)). A threshing clearance between the rotor 138 and the concaves 140 may be adjusted with one or more concave actuators 142 (schematically shown). The concave actuators 142, as well as further actuators associated with the concaves 140, may be operated based on commands from the operator and/or the controller 104. The MOG is carried rearward and released from between the rotor 138 and the concaves 140. Most of the grain (and some of the MOG) separated in the separator 136 falls downward through apertures in the concaves 140.

Agricultural material passing through the concaves 140 falls (or is actively fed) into a cleaning subsystem (or cleaning shoe) 144 for further cleaning. The cleaning subsystem 144 includes a fan 146, driven by a motor 148, that generates generally rearward air flow, as well as a sieve 150 and a chaffer 152. The sieve 150 and the chaffer 152 are suspended with respect to the chassis 106 by an actuation arrangement 154 that may include pivot arms and rocker arms mounted to disks (or other devices). The sieve 150, chaffer 252 and actuator arrangement 154 may be collectively referred to as a sieve and chaffer system. As the fan 146 blows air across and through the sieve 150 and the chaffer 152, the actuation arrangement 154 may cause reciprocating motion of the sieve 150 and the chaffer 152 (e.g., via movement of the rocker arms). The combination of this motion of the sieve 150 and the chaffer 152 with the air flow from the fan 146 generally causes the lighter chaff to be blown upward and rearward within the grain harvesting machine 102 and to flow out the rear end of the grain harvesting machine at rear outlet area or chaff outlet 157. The heavier grain falls through the sieve 150 and the chaffer 152 and accumulates in a clean grain trough 156 near the base of the grain harvesting machine 102. Depending on the operational settings of various operating parameters of the grain harvesting machine 102, some amount of grain may be unintentionally "overblown" with the lighter chaff material out the rear outlet area 157. The present disclosure is directed to a system for detecting and measuring the grain loss due to that overblown grain material.

A clean grain auger 158 disposed in the clean grain trough 156 carries the material to the one side of the grain harvesting machine 102 and deposits the grain in the lower end of a clean grain elevator 160. The clean grain lifted by the clean grain elevator 160 is carried upward until it reaches the upper exit of the clean grain elevator 160. The clean grain is then released from the clean grain elevator 160 and falls or is deposited into a grain tank 162.

Most of the grain entering the cleaning subsystem 144, however, is not carried rearward, but passes downward through the chaffer 152, then through the sieve 150. Of the material carried by air from the fan 146 to the rear of the sieve 150 and the chaffer 152, smaller MOG particles are blown out of the rear of the grain harvesting machine 102. Larger MOG particles and grain are not blown off the rear of the grain harvesting machine 102, but rather fall off the cleaning subsystem 144.

Heavier material carried to the rear of the chaffer 152 exits out of the grain harvesting machine 102. Heavier material carried to the rear of the sieve 150 falls onto a pan and is then conveyed by gravity downward into a grain tailings trough 164 in the form of "tailings," typically a mixture of grain and MOG. A tailings auger 166 disposed in the tailings trough 164 carries the grain tailings to a side of the grain harvesting machine 102 and into a grain tailings elevator 168. The grain tailings elevator 168 communicates with the tailings auger 166 at an inlet opening of the grain tailings elevator 168 where grain tailings are received for transport for further processing. At a top end of the tailings elevator 168, an outlet opening (or other offload location) 170 is provided (e.g., for return to the thresher).

In a passive tailings implementation, the grain tailings elevator 168 carries the grain tailings upward and deposits them on a forward end of the rotor 138 to be re-threshed and separated. Alternatively, in an active tailings implementation, the grain tailings elevator 168 may deliver the grain tailings upward to an additional threshing unit (not shown) that is separate from the separator 136 and where the grain tailings are further threshed before being delivered to the main crop flow at the front of the cleaning subsystem 144. A discharge beater 172 is provided for discharging material from the rotor 138. The now-separated MOG is released behind the grain harvesting machine 102 to fall upon the ground in a windrow or is delivered to a residue subsystem 174 that can include a chopper 176 and a spreader 178 to be chopped by the chopper 176 and spread on the field by the spreader 178.

The grain harvesting machine 102 may include one or more image capture sensors 180 arranged at one or more image capture areas 182 within the grain harvesting machine 102. Each image capture sensor 180 is arranged to capture images of a crop material flow in the respective image capture area of the grain harvesting machine 102. These images may be processed by the controller 104 as further described below, to measure the grain loss of the grain harvesting machine 102 due to overblown grain, and to allow for informed adjustment of the various operating subsystems of the grain harvesting machine 102 so as to reduce the grain loss. Each image capture sensor 180 may be any suitable sensor type, including radar sensors, camera sensors, lidar sensors, infrared sensors, near infrared sensors and any other sensor suitable for providing images for spectral analysis or other image processing.

There are multiple suitable locations within the grain harvesting machine 102 for location of the image capture sensors 180. For determining a likelihood of grain elements being overblown out the rear outlet area 157 the image capture sensors are preferably located in an area of the grain harvesting machine 102 below the concaves 140 of the threshing device 136 and above the chaffer 152. It is noted that as used herein the relative locational terms such as "above" and "below" are understood to be with reference to the machine 102 oriented in an upright position on a supporting surface as seen in FIG. 1.

Some of these locations are schematically shown in FIG. 1, with various specific locations identified by a suffix "a", "b", etc. A forward lower location is indicated as 180*a*. A central lower location is indicated as 180*b*. A rearward lower location is indicated as 180*c*. A forward upper location is indicated as 180*d*. A central upper location is indicated as 180*e*. A rearward upper location is indicated as 180*f*.

Figures 3, 4:
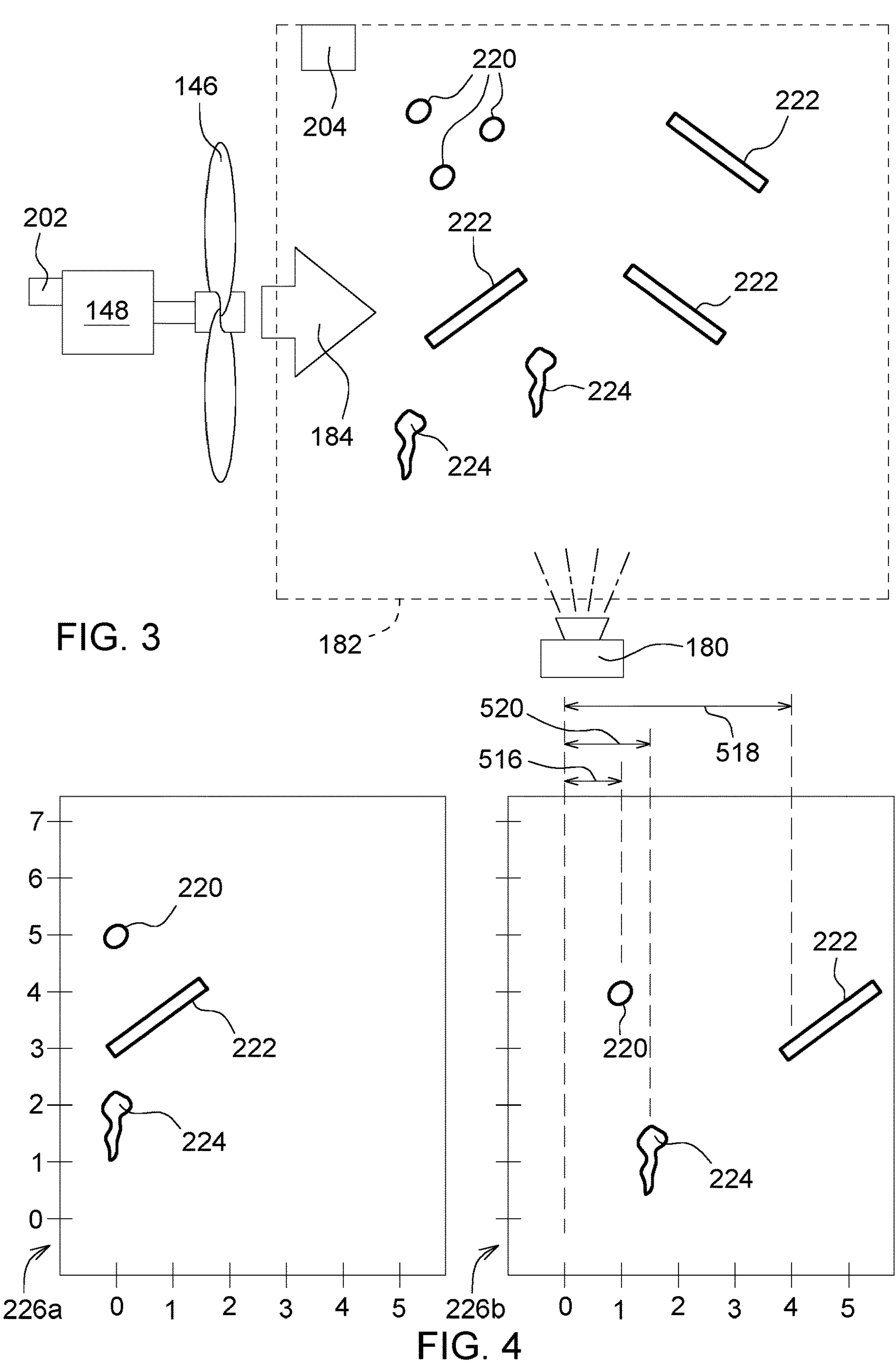
FIG. 3 is a schematic illustration of an image capture sensor and a crop material flow through an image capture area.
FIG. 4 is a schematic illustration of a sequence of images captured by the image capture sensor of FIG. 3.

FIG. 3 schematically illustrates one of the image capture sensors 180 arranged adjacent one of the image capture areas 182. The fan 146 and fan motor 148 are schematically illustrated as generating air flow 184 through the image capture area 182. A fan speed sensor 202 is shown associated with the fan 146. An air speed sensor 204 is schematically shown adjacent the image capture area 182 for directly measuring the speed of air flow through the image capture area 182.

Figure 2:
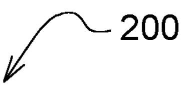
FIG. 2 is schematic illustration of a control system of the grain harvesting machine of FIG. 1.
Figure 2:
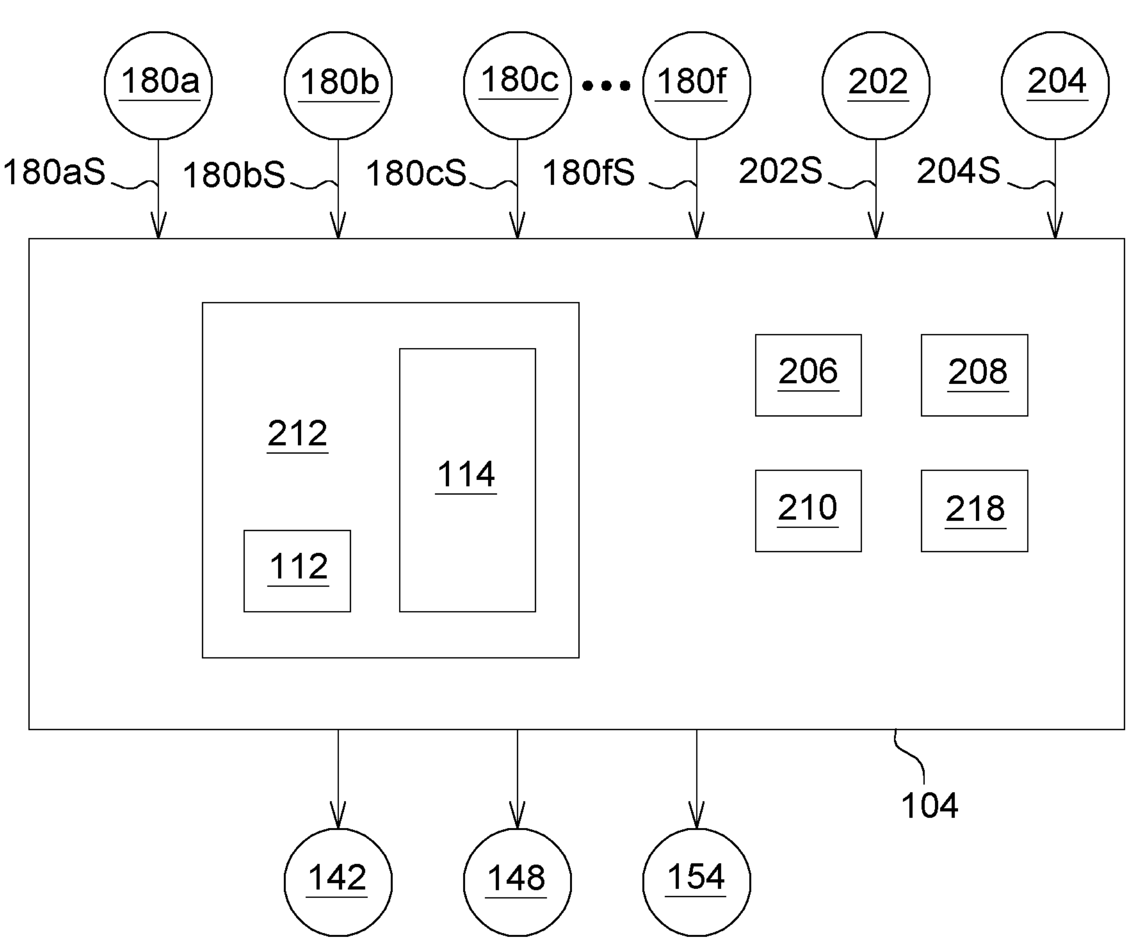

The Control System:

As schematically illustrated in FIG. 2, the machine 102 includes a control system 200 including the controller 104. The controller 104 may be part of the machine control system of the grain harvesting machine 102, or it may be a separate control module. The controller 104 may for example be mounted in a control panel 212 located at the operator's station 110. Controller 104 is configured to receive input signals from the various sensors. The signals transmitted from the various sensors to the controller 104 are schematically indicated in FIG. 2 by lines connecting the sensors to the controller with an arrowhead indicating the flow of the signal from the sensor to the controller 104.

For example, image signals 180*a*S-180*f*S from the image capture sensors 180*a*-180*f* will be received by controller 104. Controller 104 may also receive a fan speed signal 202S from the fan speed sensor 202 associated with the fan 146. Controller 104 may also receive an air speed signal 204S from the air speed sensor 204 which may be disposed in the grain harvesting machine 102 adjacent any one or more of the image capture areas 182 as schematically shown in FIG. 3. There may be multiple air speed sensors 204 throughout the grain harvesting machine 102.

Similarly, the controller 104 will generate control signals for controlling the operation of various actuators of the grain harvesting machine 102. Those actuators may for example be associated with various subsystems of the grain harvesting machine which affect the grain loss within the machine. Those actuators may include for example, the concave actuators 142, the fan motor 148, and the actuation arrangement 154 associated with the sieve 150 and chaffer 152, just to name a few.

Controller 104 includes or may be associated with a processor 206, a computer readable medium 208, a data base 210 and the input/output module or control panel 212 having the previously mentioned display 114. The previously mentioned input/output device 112, such as a keyboard, joystick or other user interface, is provided so that the human operator may input instructions to the controller. It is understood that the controller 104 described herein may be a single controller having all of the described functionality, or it may include multiple controllers wherein the described functionality is distributed among the multiple controllers.

Various operations, steps or algorithms as described in connection with the controller 104 can be embodied directly in hardware, in a computer program product 218 such as a software module executed by the processor 206, or in a combination of the two. The computer program product 218 can reside in RAM memory, flash memory, ROM memory, EPROM memory, EEPROM memory, registers, hard disk, a removable disk, or any other form of computer-readable medium 208 known in the art. An exemplary computer-readable medium 208 can be coupled to the processor 206 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 208 and/or database 210 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Methods of Operation:

The various methods of operation disclosed herein are based upon an improved detection of grain loss due to overblown grain using image processing of images captured by one or more of the image capture sensors 180.

As schematically shown in FIG. 3 the air flow 184 through the image capture area 182 entrains a crop material flow which may be described as including known grain elements 220, known MOG elements 222 and unknown elements 224 not yet identified as grain or MOG. The image capture sensor 180 may capture a sequential series of images 226 such first image 226*a* and second image 226*b* schematically shown in FIG. 4.

By appropriate analysis of the images 226*a* and 226*b* the known grain elements 220 may be identified and their velocities may be determined. Based at least in part on those velocities a determination may be made of the likelihood of each grain element being overblown. Velocities may also be determined for the known MOG elements 222 and the unknown elements 224.

Figure 5A:
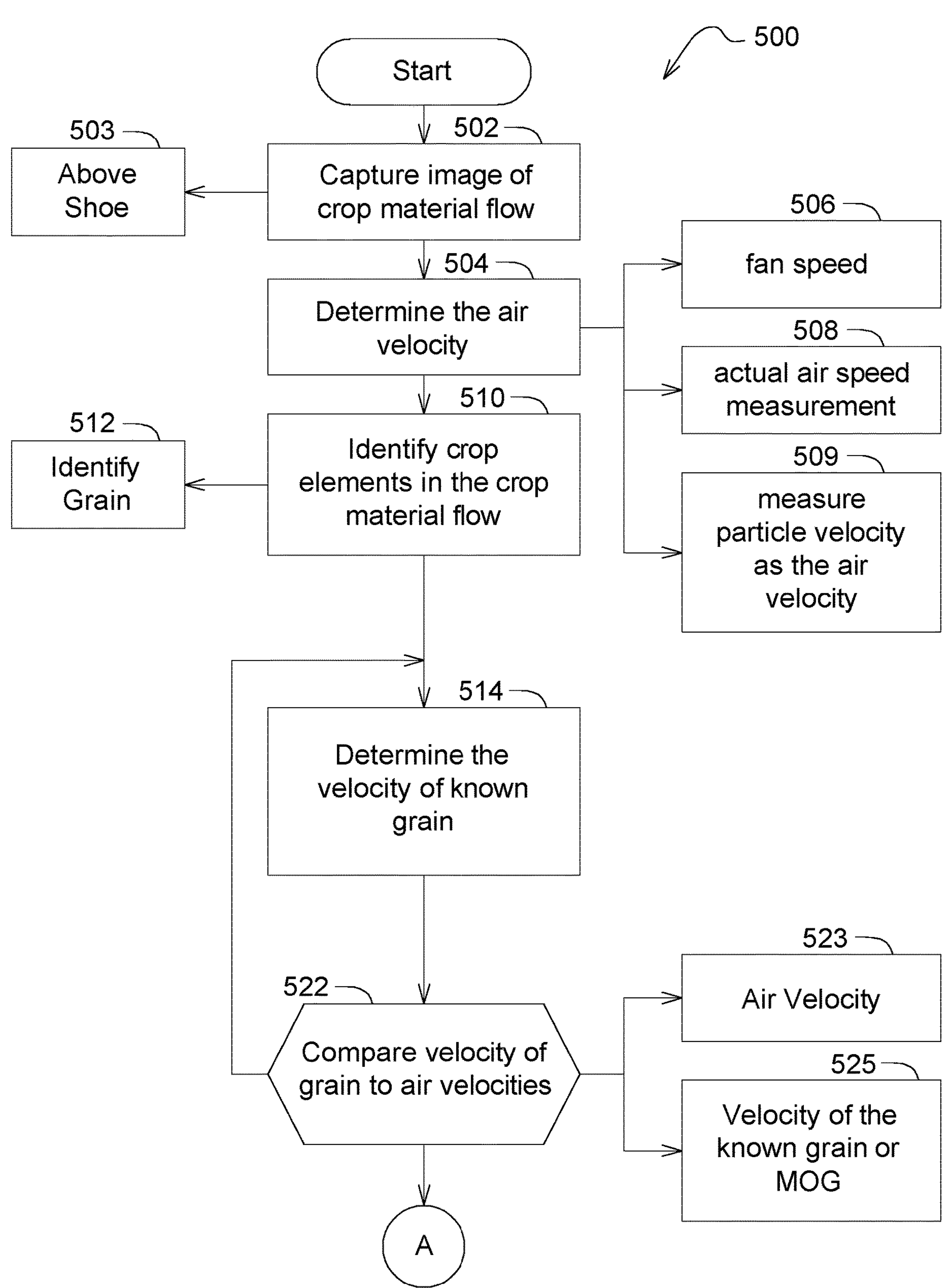
FIGS. 5A-5B comprise a flow chart summarizing a process to identify grain elements in the crop material flow and determine a likelihood of each grain element being overblown, and thus lost, based at least in part on the velocity of each of the grain elements.
Figure 5B:
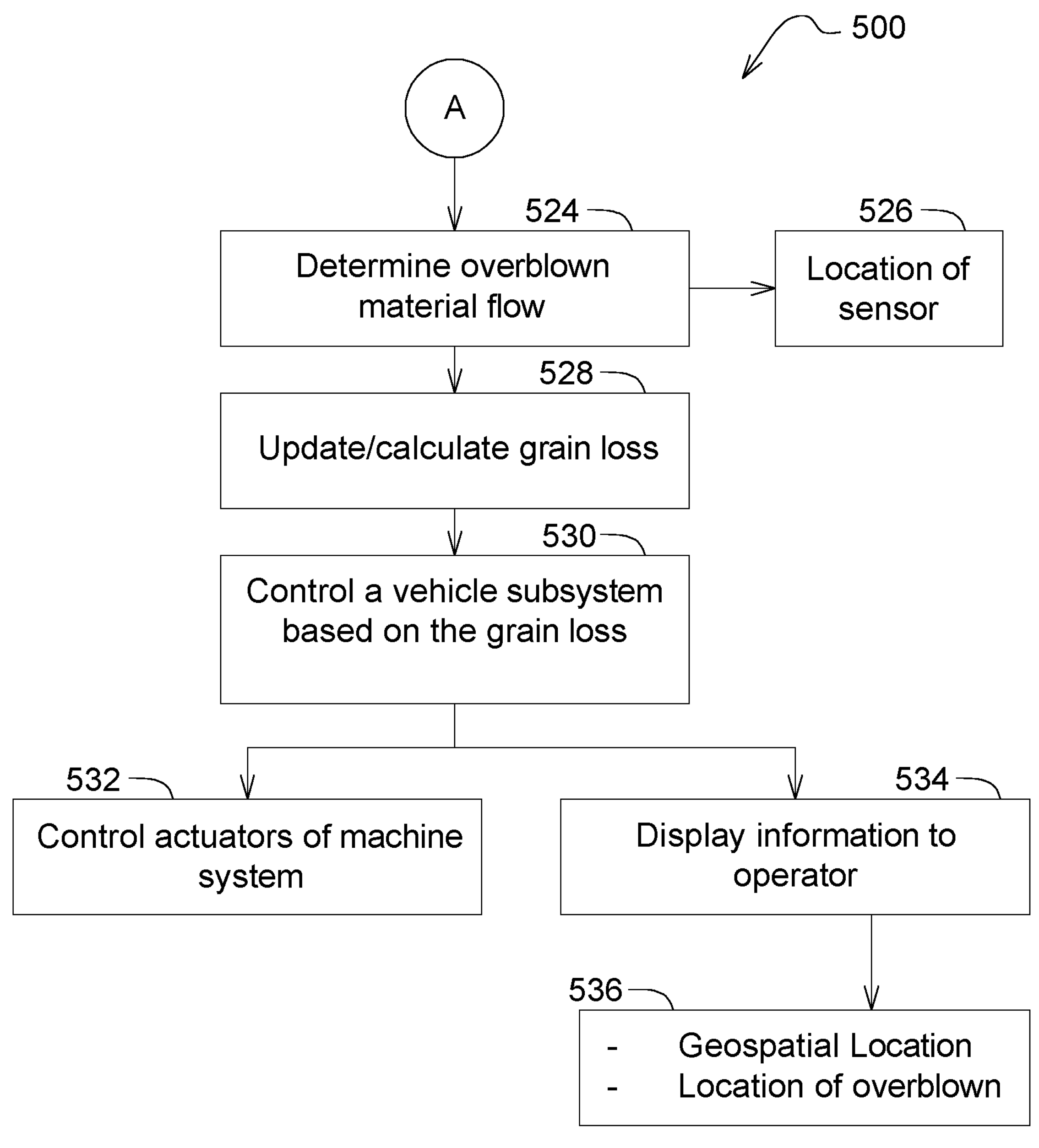

FIGS. 5A and 5B show a flow chart of one embodiment of such a method which may be provided by suitable programming via the computer software 218 of the controller 104. It is noted that some of the steps described below may be omitted in some embodiments of the method. A process 500 may begin with step 502 of capturing an image 226 of crop material flow. As indicated at step 503 the image location is preferably above the shoe 144, i.e., above the chaffer 152 and sieve 150. The image may be captured as schematically shown in FIG. 3 wherein one of the image capture sensors 180 captures an image of the crop material flow which includes known grain elements 220, known MOG elements 222, and unidentified elements 224.

In step 504 a determination is made of the air velocity of the air flow 184. As indicated at step 506 the determination of the air velocity may be based at least in part on a fan speed value of the fan 146 as detected by fan speed sensor 202. Alternatively, as indicated at step 508 the determination of the air velocity may be based at least in part on an actual air speed measurement using the air speed sensor 204. Further alternatively, as indicated at step 509 the air velocity may be assumed to be equal to or based on a velocity of the known MOG elements which are assumed to be entrained in the air flow.

In step 510 crop elements are identified in the crop material flow. As indicated at step 512 this may include identifying the known grain elements 220. The identification of crop elements may include identification of the known MOG elements 222 and identification of unknown elements 224 as elements other than the known grain elements 220 and the known MOG elements 222.

The identifying of the known grain elements 220 at step 512 and the identification of the known MOG elements 222 may be accomplished by analyzing the images such as 226*a*, 226*b* using an image processing algorithm to identify known signatures of the known grain elements 220 and the known MOG elements 222. Such image processing algorithms may include use of a neural network. The known signatures may be based on various characteristics of the elements being analyzed, including for example shape of the elements, reflectivity or absorption by the elements of electromagnetic energy of various wavelengths, color of the elements, and any other relevant characteristics. For example, free threshed grain in the form of wheat, beans or corn will each have a characteristic shape and color, which may be considered a signature of those types of grain. Similarly, the respective chaff material associated with each type of grain will have characteristic shapes and/or color which may be considered a signature of those types of MOG. The particular signature of the respective type of grain or its associated MOG will of course also be a function of the type of image capture sensor 180 being used.

Next, at step 514 a determination is made of the velocity of the known grain elements 220. A similar determination may be made of the velocity of the known MOG elements 222.

One technique for determining the velocity of the various elements in an image includes identifying relative movement of each of the elements between a timed sequential set of images such as images 226*a* and 226*b* schematically shown in FIG. 4. For example, in the first image 226*a* three elements have been identified. One is a known grain element 220. One is a known MOG element 222. Another is an unknown element 224. For the example of FIG. 4 the air stream 184 is moving from left to right through the image. The left to right position of each element within the image can be determined by the distance scale shown at the bottom of the images, and in the first image 226*a* each element is initially located at position 0. In the second image 226*b*, which occurs at a known time interval after the first image 226*a*, these same three elements are seen, but they have moved different distances from left to right as they are carried by the air stream 184. The known grain element 220 has moved a distance 516 of "1 unit" from position 0 to the position 1. The known MOG element 222 has moved a distance 518 of "4 units" from position 0 to position 4. The unknown element 224 has moved a distance 520 of about 1.5 units. Knowing the time difference between images 226*a* and 226*b* the velocities of each of the three elements can be calculated.

Also, the velocity of the various elements may be determined by techniques other than comparison of sequential images. For example, the velocity of each element may be measured using a Doppler radar or like sensor in combination with the image capture sensor 180.

Then as indicated at step 522 the velocity of the known grain elements 220 may be compared to the air velocity. As noted in sub step 523 the comparison of grain velocity may be made to the air velocity directly.

Or as noted in sub step 525 the comparison of grain velocity may be made to the velocity of known grain 220 or known MOG 222. For example, if the vast majority of known grain elements 220 are observed to be moving laterally at a certain velocity, and if one particular known grain element 220 is observed to be moving laterally at a substantially higher velocity, it may be concluded that the one particular known grain element has been entrained in the air flow and is probably being overblown. Or if the known MOG elements, which are assumed to be entrained in the air flow, are observed to be moving laterally at a certain velocity, and if one particular known grain element 220 is observed to be moving laterally at a velocity very close to the velocity of the known MOG elements 222, it may be concluded that the one particular known grain element has been entrained in the air flow and is being probably overblown.

Then as indicated at step 524 a determination can be made as to the likelihood of each of the known grain elements 220 being overblown. This determination may be based at least in part on the comparing of the velocity of each of the known grain elements 220 to the air velocity. As further indicated at step 526 the determination of the likelihood of each of the known grain elements 220 being overblown may also be based at least in part on the location of the sensor 180. This determination of the likelihood of each of the known grain elements 220 being overblown may be made generally as follows.

As previously noted, the air stream 184 from the fan 146 is generally flowing rearward and upward through and across the chaffer 152 and sieve 150 from the location of the fan 146 toward the rear outlet area 157. For a properly operating system the lighter chaff and other MOG material is entrained in the air stream 184 and carried out the rear outlet area 157, and the heavier denser grain drops downward through the air stream 184 and through the chaffer 152 and sieve 150 to be received in the clean grain trough 156 or the grain tailings trough 164. But there may also be some grain elements 220 which unintentionally are entrained in the air stream 184 and carried out the rear outlet area 157 and thus lost as "overblown" grain. It is desirable to minimize the amount of this overblown grain loss by optimal adjustment of the various relevant operating parameters of the grain harvesting machine 102. The present system provides the ability to determine, at least approximately, the amount of this overblown grain loss.

The determination of the likelihood of a given known grain element 220 being overblown may be based at least in part on a comparison of the grain element velocity to the air velocity, and also based at least in part on the location of the grain element 220. The assumption is that grain elements 220 which are properly flowing downward toward the clean grain trough 156 or the grain tailings trough 164 will have a lateral velocity parallel to the direction of the air stream 184 substantially less than the velocity of the air stream 184. But if a known grain element 220 is observed to be moving laterally at a velocity near that of the air stream 184 this may be an indication that this grain element 220 is being overblown. This is even more likely to be the case if the grain element 220 is located relatively high above the chaffer 152 or relatively far rearward near the outlet area 157.

It will be appreciated that algorithms used by the controller may include various parameters that are considered for each grain element 220 and the parameters may be weighted depending on their significance.

With regard to weighting, the likelihood that a given grain element 220 is going to be overblown increases as the lateral velocity as a proportion of air speed increases. If the lateral velocity of the grain element is determined to exceed 50% of the air velocity, one probability of being overblown may be assigned to that element. If the lateral velocity of the grain element is determined to exceed 75% of the air velocity, a second increased probability of being overblown may be assigned to that element. If the lateral velocity of the grain element is determined to exceed 90% of the air velocity, a third still further increased probability of being overblown may be assigned to that element.

And as noted at step 526, the determination of whether each of the grain elements is likely to be overblown may also be based at least in part on a location of each of the grain elements within the grain harvesting machine 102 at the point of observation.

The determination of whether each of the grain elements 220 is likely to be overblown out of the grain harvesting machine 102 may include assigning an increasing probability of being overblown based on an increasing closeness of each grain element 220 to the chaff outlet area 157 of the chaffer and sieve system 150, 152 of the grain harvesting machine 102. For example, when using multiple image capture areas 180*a*-180*f* above the chaffer 152 as illustrated in FIG. 1, a higher probability of being overblown may be assigned to grain elements 220 observed in the downstream image capture areas 180*c* and 180*f* as compared to grain elements 220 observed in the upstream image capture areas 180*a* and 180*d*, respectively. And depending upon the type of sensing technology being used, some image capture devices 180 may capture images over a large area, and different weights may be given to the likelihood of being overblown depending on the location of the grain element within the image capture area.

And the determination of whether each of the grain elements 220 is likely to be overblown out of the grain harvesting machine 102 may include assigning an increasing probability of being overblown based on an increasing height of each grain element 220 above the chaffer and sieve system 150, 152 of the grain harvesting machine 102. A higher probability of being overblown may be assigned to grain elements 220 observed in the upper image capture areas 180*d*, 180*e* and 180*f* as compared to the lower image capture areas 180*a*, 180*b* and 180*c*, respectively. And depending upon the type of sensing technology being used, some image capture devices 180 may capture images over a large area, and different weights may be given to the likelihood of being overblown depending on the location of the grain element within the image capture area.

It will further be appreciated that in some embodiments the control algorithm could view the absolute velocity of the grain element 220, as opposed to considering the velocity proportional to air velocity. For example, if the image capture device is focused solely on an image capture area such as 180*f* which located high above the chaffer 152 near the outlet 157, the algorithm could include a preset absolute threshold value for lateral speed of the grain elements 220 indicative of a likelihood that the grain element 220 is going to be overblown.

Continuing with the process 500 as seen in FIG. 5B, after step 524 of determining whether a grain element 220 is likely to be overblown, the controller 104 may update and or calculate a total grain loss or grain loss rate for the grain harvesting machine 102 as indicated at step 528.

And as indicated at step 530 the controller 104 may then control a subsystem of the grain harvesting machine 102 at least in part based upon the determination of whether the grain elements 220 are likely to be overblown. There are several such subsystems the adjustment of which may affect the grain loss due to overblown grain.

The most important subsystem to be considered is often the fan 146. If the fan 146 is operating at an unnecessarily high fan speed it may result in an air speed of the air stream 184 that is higher than necessary to remove the chaff and other MOG material 222 and thus may cause excessive grain loss due to overblown grain in the air stream exiting at 157. Thus, if an excessive grain loss is detected the controller 104 may automatically direct a reduction in fan speed. Of course it will be understood that the controller 104 will be monitoring other parameters, such as unwanted MOG making its way into the grain tank 102, and the control algorithm may involve a balancing of these factors to minimize overblown grain loss to the extent that can be accomplished without a deterioration in the cleanliness of the resulting separated grain in the grain tank 162.

Another subsystem which may be adjusted is the chaffer 152 and/or the sieve 150. As will be understood by those skilled in the art each of these mechanisms typically has a pattern of adjustable size openings formed by a series of overlapping fingers which can be adjusted to adjust the opening size of the chaffer 152 and/or the sieve 150.

And another subsystem which may be adjusted is the threshing device 136. The speed of the threshing device 136 as well as a thresher clearance between the rotor 138 and threshing concaves 140 may be adjusted.

As further indicated at step 532 the control of the various vehicle subsystems may be accomplished by controlling an actuator of each machine subsystem. For example, to control the fan speed of fan 146 the controller may control the speed of motor 148 which drives the fan 146. The rotor speed of rotor 138 of threshing device 136 may be adjusted by adjusting a speed of a drive motor (not shown) of the rotor 138. The clearance between the rotor 136 and the concaves 140 may be adjusted via the concave actuators 142. The operation of the sieve 150 and chaffer 152 may involve adjustment of a speed of the actuation arrangement 154, or of actuators controlling the opening sizes of the sieve 150 and chaffer152. Also the advance speed of the grain harvesting machine 102 may be adjusted to control the feedrate of crop material entering the header 118.

As indicated at step 534 the controller 104 may be configured to display information representative of the detected grain loss on the display 114 of control panel 212 for observation by the human operator of the machine 102. As indicated at step 536 that information may include a corresponding geospatial location of the machine. For example, the information representative of the detected grain loss may be displayed in graphical form showing with color coding or shading the relative overblown grain loss in the various geographical areas traversed by the grain harvesting machine 102. Such date may for example indicate that the problem of overblown grain loss is associated with terrain features such as an uphill inclination of the harvesting machine.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of operating a grain harvesting machine, the method comprising:

capturing images of a crop material flow in an image capture area of the grain harvesting machine;

identifying at least one grain element in the images;

determining a velocity of the grain element;

determining whether the grain element is likely to be overblown out of the grain harvesting machine based at least in part on the velocity of the grain element; and controlling a subsystem of the grain harvesting machine based at least in part on the determination of whether the grain element is likely to be overblown.

2. The method of claim 1, further comprising:

determining an air velocity in the image capture area;

comparing the velocity of the grain element to the air velocity; and wherein the determining whether the grain element is likely to be overblown out of the grain harvesting machine is based at least in part on the comparing of the velocity of the grain element to the air velocity.

3. The method of claim 2, wherein:

the determining whether the grain element is likely to be overblown out of the grain harvesting machine includes determining that the grain element is likely to be overblown if the velocity of the grain element exceeds 50% of the air velocity.

4. The method of claim 2, wherein:

the determining of the air velocity in the image capture area is based at least in part on a fan speed.

5. The method of claim 2, wherein:

the determining of the air velocity in the image capture area is based at least in part on a measured air speed detected by an air speed sensor.

6. The method of claim 1, wherein:

the determining whether the grain element is likely to be overblown out of the grain harvesting machine is also based at least in part on a location of the grain element within the grain harvesting machine.

7. The method of claim 6, wherein:

the determining whether the grain element is likely to be overblown out of the grain harvesting machine includes assigning an increasing probability of being overblown based on an increasing closeness the grain element to a chaff outlet of a chaffer and sieve system of the grain harvesting machine.

8. The method of claim 6, wherein:

the determining whether the grain element is likely to be overblown out of the grain harvesting machine includes assigning an increasing probability of being overblown based on an increasing height of the grain element above a chaffer and sieve system of the grain harvesting machine.

9. The method of claim 1, wherein:

capturing images is performed with an image capture sensor located at one or more locations on the grain harvesting machine.

10. The method of claim 9, wherein:

the one or more locations includes an area above a chaffer and sieve system of the grain harvesting machine.

11. The method of claim 1, wherein:

controlling a subsystem of the grain harvesting machine includes controlling a clearance opening size in a chaffer and/or a sieve of the grain harvesting machine.

12. The method of claim 1, wherein:

controlling a subsystem of the grain harvesting machine includes controlling a fan speed of a blower fan blowing air across a chaffer and sieve system of the grain harvesting machine.

13. The method of claim 1, wherein:

controlling a subsystem of the grain harvesting machine includes controlling a threshing speed of a thresher of the grain harvesting machine.

14. The method of claim 1, wherein:

controlling a subsystem of the grain harvesting machine includes controlling a thresher clearance of a thresher of the grain harvesting machine.

15. The method of claim 1, further comprising:

displaying overblown grain loss information to an operator of the grain harvesting machine.

16. The method of claim 1, wherein:

determining the velocity of the grain element includes identifying relative movement of the grain element between a timed sequential set of images.

17. A grain harvesting machine for harvesting a crop material and separating the crop material into grain and material other than grain (MOG), comprising:

a grain thresher configured to separate grain from MOG;

a chaffer and sieve system located below the grain thresher;

a blower fan configured to blow air across the chaffer and sieve system;

at least one image capture sensor configured to capture images of a crop material flow in an image capture area of the grain harvesting machine; and a controller configured to:

identify one or more elements of the crop material flow in the images as grain elements;

determine a velocity of at least one of the grain elements;

determine whether the at least one grain element is likely to be overblown out of the grain harvesting machine based at least in part on the velocity of the at least one grain element; and control at least one operating parameter of the grain harvesting machine based at least in part on the determination of whether the at least one grain element is likely to be overblown.

18. The grain harvesting machine of claim 17, wherein the controller is further configured to:

determine an air velocity in the image capture area;

compare the velocity of the at least one grain element to the air velocity; and determine whether the at least one grain element is likely to be overblown out of the grain harvesting machine based at least in part on the comparing of the velocity of the at least one grain element to the air velocity.

19. The grain harvesting machine of claim 17, wherein:

the image capture area is located below the grain thresher and above the chaffer and sieve system;

the controller is configured such that determining whether the at least one grain element is likely to be overblown out of the grain harvesting machine includes assigning an increasing probability of being overblown based on an increasing closeness of the at least one grain element to a rear outlet of the chaffer and sieve system; and the controller is configured such that determining whether the at least one grain element is likely to be overblown out of the grain harvesting machine includes assigning an increasing probability of being overblown based on an increasing height of the at least one grain element above the chaffer and sieve system.

20. The grain harvesting machine of claim 17, wherein: the at least one operating parameter includes a fan speed of the blower fan.

* * * * *